Patented Oct. 2, 1951

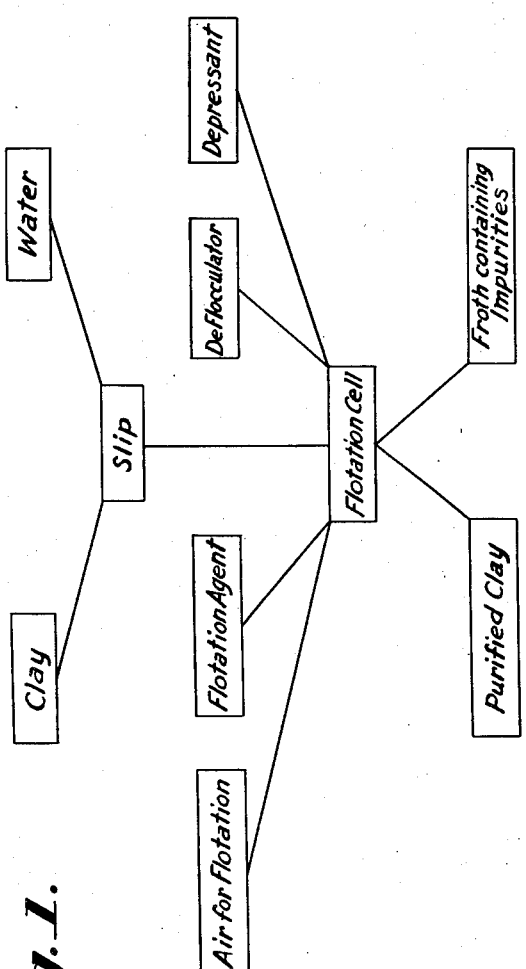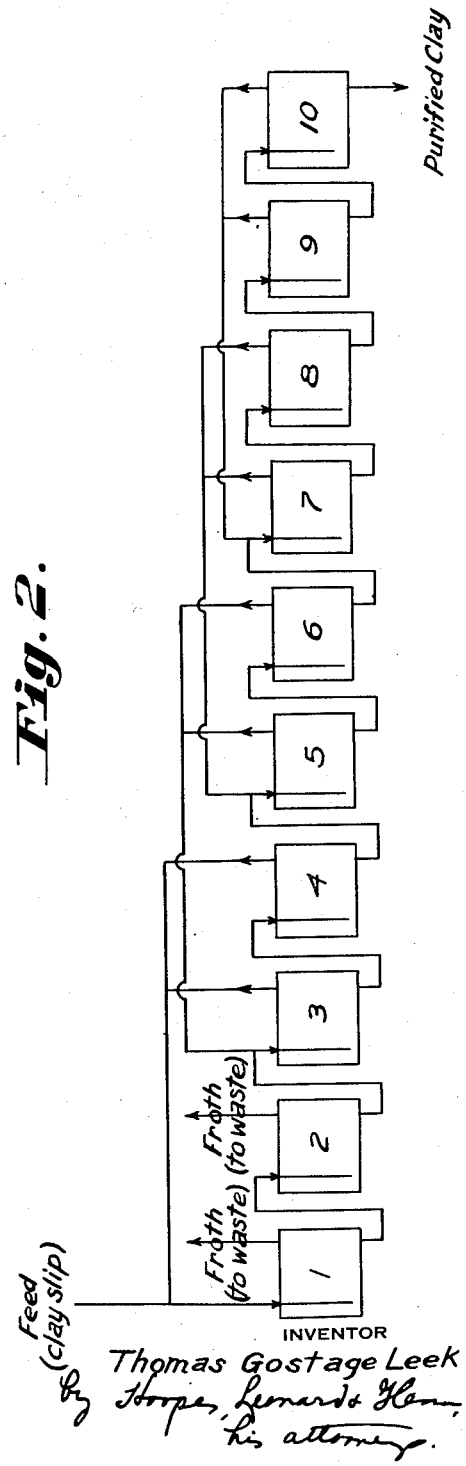

2,569,680

UNITED STATES PATENT OFFICE 2,569,680

FLOTATION PROCESS FOR WHITENING CLAY

Thomas Gostage Leek, New York, N. Y., assignor to Edgar Brothers Company, Metuchen, N. J., a corporation of New Jersey Continuation of application Serial No. 660,139, April 6, 1946. This application February 4, 1949, Serial No. 74,646

13 Claims. (Cl. 209—10)

This invention relates to the whitening of clay. It relates particularly to the removal of discoloring impurities from clay to adapt it to uses in which a relatively white or bright clay is required, as, for example, in the making of the better grades of paper and paint. Very bright clays are also in demand as textile fillers.

For many years efforts have been made to find in nature or produce from natural clays very bright clays for the above mentioned and other uses. The brightest clays found in nature are in foreign lands and hence, due to transportation costs, are relatively expensive when imported to the United States. For example, clays are available in England which in their natural state have a brightness as high as 91 as measured by the standard General Electric brightness tester. These clays are, however, for the most part primary clays which are relatively coarse and unsuited for uses requiring fine clay. There are some fine white sedimentary clays available in nature in foreign countries but they are virtually prohibitive in cost for commercial use in the United States.

There are in the United States some deposits of primary clay which are relatively bright, but such clay is coarse and not as well suited in texture to the uses above referred to as is sedimentary clay which is finer but which contains more coloring matter than primary clay. The sedimentary clay is undesirably dark because of accretion of ferruginous and titaniferous matter incident to the geological process of sedimentation. For example, most sedimentary clays contain substantial amounts of ilmenite which has a pronounced darkening effect.

It has been customary to whiten clay by first subjecting the clay to a sedimentation or settling treatment whereby the relatively large particles of coloring matter are removed and thereafter bleaching the clay by treating it with zinc dust and sulphur dioxide gas or with zinc hydrosulphite. Such treatment renders the iron in the clay largely water soluble. The clay is then washed, settled, filter-pressed and dried. By this process domestic sedimentary clays have been whitened to a maximum brightness of 86 or slightly over. A domestic sedimentary clay whitened to a brightness of 85 is considered to be representative of the best practice prior to the present invention.

An increase in brightness of one or more points on the brightness scale is a matter of commercial importance.

I have discovered how to whiten clay to a materially greater extent than has heretofore been possible. My invention is of especial utility in the whitening of the darker commercial clays, particularly domestic sedimentary clays. I can whiten to a brightness of 87 and higher clays which heretofore could not be whitened above a maximum of from 85 to 86 and a fraction. I can increase the attainable brightness of a given clay by as much as 5% or more. Thus I am enabled to produce whitened clays adapted for the making of the finer papers, paints and textiles and which in addition to being superior to the best whitened domestic clays heretofore available compete with far more costly imported clays.

An unexpected advantage of my invention is that clay treated by my process fires to a color definitely whiter than that of the same clays which have not been subjected to the flotation treatment. Reflectance curves on clays before and after the flotation treatment show that the increase in reflectance is about the same over the entire range of the readings.

I have discovered that a superior whitened clay can be produced by subjecting the clay to flotation in the presence of a flotation agent selective to the impurities in the clay which are mechanically separable therefrom whereby such impurities are floated off and the clay from which the impurities have been removed is delivered in the tailings. I preferably combine the flotation treatment with treatment by sedimentation. The sedimentation treatment removes relatively large particles of coloring matter from the clay and the flotation treatment removes relatively small particles which are mechanically separable from the clay. The flotation and sedimentation treatments may be carried out in either order, that is, either flotation first or sedimentation first.

I also preferably bleach the clay in addition to treating it by flotation and possibly also by sedimentation. The bleaching treatment may be performed either as the first step or intermediate the other two steps or as the last step. A preferred order of procedure is to treat the clay by sedimentation to remove particles of coloring matter, then subject the clay to flotation in the presence of a flotation agent selective to the impurities in the clay which are mechanically separable therefrom but smaller than the particles removed by sedimentation, whereby such impurities are floated off and the clay from which the impurities have been removed is delivered in the tailings, and finally bleach the clay.

By my process I remove from clay particles which are not removed by either or both of sedimentation and bleaching. These are the smaller particles which remain in suspension during sedimentation. The bleaching treatment has definite limitations as to the amount of coloring matter it will remove. Some of the smaller particles of coloring matter which remain in suspension during the sedimentation treatment are not removed in bleaching. As indicated above, the best results heretofore obtainable with domestic sedimentary clays are brightnesses of 85 or 86 or slightly more. By my process I remove a considerable portion of the smaller particles of coloring matter which remain in suspension during the sedimentation treatment and which according to the prior methods of whitening would go with the clay to the bleaching apparatus.

I have found that clays which are treated by sedimentation, flotation and bleaching attain a final whiteness remarkably greater than if the flotation step is omitted. I can whiten to brightnesses of 87 and above, and in may cases well up into the 90's, clays which prior to my invention could not be whitened to brightnesses above 86 plus. The result of this is that ordinary domestic or imported dark sedimentary clays can now be whitened to compete with the very expensive imported clays and can be used in the maufacture of very fine grades of paper, paint and textiles. The ultimate effect is material reduction in cost of high grade products and also improvement in quality of lower grade products. The costly imported clays will, generally speaking, no longer be needed. However, it is possible by use of my invention to produce fine clays having brightnesses in the high 90's which heretofore have been practically unobtainable anywhere. Such clays can be produced by treatment by my process of the fine white imported clays. By producing a whitened domestic clay having a brightness of at least 87 I provide a low cost commercial clay superior to any heretofore produced in this country. When the whiteness of such a clay is increased to at least 90 it competes with the imported unbleached naturally white clay.

The brightness of the natural clay prior to whitening in accordance with my invention may vary widely. Ordinarily the brightness of the clay prior to treatment, when a superior commercial white domestic clay is desired, will be between 55 and 75. I can without difficulty by my process increase the whiteness of such a clay to at least 87. To compete with the unbleached white imported clays I can and do whiten the clay to a brightness of at least 90.

While I have referred to domestic clays and particularly to sedimentary domestic clays, there are, of course, in other countries sedimentary clays which are of about the same type and quality as the domestic sedimentary clays, and my invention is equally applicable to the treatment thereof.

The clays may, if desired, be charged directly to the flotation apparatus and after completion of the flotation treatment be bleached as usual. In such cases the flotation step is relied on to remove the larger particles of coloring matter which would have been removed by settling out if the sedimentation step had been employed. However, I prefer to remove the larger particles by sedimentation, relying on the intermediate step for removal of smaller particles which heretofore have been attempted to be removed by bleaching alone.

I preferably whiten clay by forming a slip of the clay and subjecting the slip to flotation in the presence of a flotation agent selective to the impurities in the clay which are mechanically separable therefrom whereby such impurities are floated off and the clay from which the impurities have been removed is delivered in the tailings. Desirably the clay is deflocculated before it is subjected to flotation. Also the clay particles are preferably depressed to provide for most effective flotation. The slip is preferably treated so that during the flotation step a substantial froth is formed on the surface of the liquid.

The floation agent which I prefer to use is an emulsion of a fatty acid and a fatty acid amine. For example, I may employ AMAC Coco-B, which is the acetate of an amine prepared from coconut oil fatty acids made by Armour and Company of Chicago; or I may use AMAC 118.5, likewise a product of Armour and Company which I understand to be the acetate of the amine prepared from the fatty acids in tall oil.

My process may be carried out either as a batch operation or as a continuous process, the continuous process being preferred for commercial operations.

Other details, objects and advantages of the invention will become apparent as the following description of certain present preferred methods of practicing the same proceeds.

In the accompanying drawings I have illustrated by diagrams certain present preferred methods of practicing the invention, in which Figure 1 is a flow sheet for a single flotation cell, and Figure 2 is an illustration of the practice of my invention employing ten flotation cells in series.

I shall explain the invention by a specific example showing how it may be practiced. I first make a slip of clay and water, the preferred proportions being about one part of clay to four parts of water by weight. I condition the slip by admixing therewith the equivalent of eight pounds of soda ash per ton of clay and four pounds of sodium silicate per ton of clay. This may be done in the flotation cell itself by the simple expedient of using the flotation cell as a mixer and not introducing any air, or the conditioning may be done in a separate conditioner before the slip is introduced into the flotation cell. The soda ash is a deflocculating agent and also serves to control the pH value of the slip. The sodium silicate is primarily a depressant although it also assists in deflocculating the clay. The depressing effect is obtained through preferential wetting of the clay by water which is promoted by sodium silicate. Thus during flotation the clay particles tend to sink in the flotation cell while the impurities are caused to rise by the air passing upwardly through the cell until they become a part of the froth.

I dissolve in hot water a quantity of AMAC Coco-B equal to about one-fourth of one per cent. by weight of the quantity of water used. The resultant solution is faintly alkaline and I add enough hydrochloric acid to make the solution faintly acid. I then emulsify the solution with a quantity of oleic acid equal to about three or four per cent. by weight of the quantity of solution. The conditioned clay slip being in the flotation cell, I introduce the emulsion into the flotation cell in a quantity equal to about 1.84 pounds of oleic acid per ton of clay. At the same time I add about .15 pound per ton of clay of Pentasol Frother No. P–26, which is a mixture of amyl alcohols prepared by Sharples Chemicals, Inc. of Philadelphia. I then pass air through the flotation cell while agitating the contents thereof for five to ten minutes. Then the air is temporarily shut off and the same amounts as explained above of emulsion and Pentasol Frother No. P-26, are again introduced. The flotation operation is then resumed until the clay has been subjected to flotation treatment for a total time of fifteen to twenty minutes. The impurities in the clay rise and become a part of the froth while the clay from which the impurities have been removed is delivered in the tailings.

The operation above described is that for a single flotation cell in batch operation. It may be desired to modify this batch process by employing a second smaller flotation cell in series with the first cell. When this is done the froth from the first cell is introduced into the second cell where it is subjected to flotation for about ten minutes. The froth from the second cell goes to waste. The tailings from the second cell are called "middlings" and can go back into the first cell for recirculation. The tailings from the first cell, whether or not the second cell is used, are the refined clay ready for such subsequent treatment as may be desired. If the clay was not subjected to sedimentation prior to the flotation treatment it may be subjected to sedimentation thereafter to separate the "slimes" or refined clay from the "sands" or impurities which were not removed by flotation. The "slimes" may then be bleached if desired.

Instead of using AMAC Coco-B as above described I may use AMAC 118.5 which gives at least as good results. Also I may use certain grades of refined tall oil in place of oleic acid; the tall oil appears to give a reagent which is more generally applicable to various types of crude clay than that resulting when oleic acid is used. Refined tall oil products which give good results are Neofat S142 of Armour and Company and Indusoil of West Virginia Pulp and Paper Co. When a refined tall oil product is used in place of oleic acid I can dispense entirely with the Pentasol Frother No. P-26, since a sufficiently firm froth is formed without its use.

For commercial operations a flotation apparatus as shown in Figure 2 is preferably used. That apparatus consists of ten flotation cells in series, the cells being numbered in Figure 2 from 1 to 10, inclusive. They may be of any appropriate or standard construction. Each cell contains an agitator and a compressed air inlet near its bottom so that the contents of the cell are agitated and compressed air passes upwardly therethrough in well known manner. As shown in Figure 2, the feed is conditioned clay slip which goes into cell No. 1. The tailings from each of the first nine cells go to the next succeeding cell and the tailings from the tenth cell are the purified clay. The froth from the first two cells goes to waste. The froth from cells Nos. 3 and 4 goes back to cell No. 1 where it re-enters with the feed. The froth from cells Nos. 5 and 6 goes back to cell No. 3, the froth from cells Nos. 7 and 8 goes back to cell No. 5 and the froth from cells Nos. 9 and 10 goes back to cell No. 7. The operation is continuous, purified clay being delivered from cell No. 10.

This application is a continuation of my copending application Serial No. 660,139, filed April 6, 1946, now abandoned.

While I have described certain present preferred methods of practicing my invention it is to be understood that the invention is not limited thereto but may be otherwise variously practiced and embodied within the scope of the following claims.

I claim:

1. A method of whitening clay comprising adding a deflocculating agent to the clay to deflocculate it and subjecting the clay while in deflocculated condition to flotation in the presence of an added flotation agent selective to the impurities in the clay which are mechanically separable therefrom while passing air upwardly through the clay and forming a froth whereby such impurities are floated off in the froth and the clay from which the impurities have been removed is delivered in the tailings.

2. A method of whitening clay comprising adding a deflocculating agent to the clay to deflocculate it, adding a depressant to depress the clay particles and subjecting the thus treated clay while in deflocculated condition to flotation in the presence of an added flotation agent selective to the impurities in the clay which are mechanically separable therefrom while passing air upwardly through the clay and forming a froth whereby such impurities are floated off in the froth and the clay from which the impurities have been removed is delivered in the tailings.

3. A method of whitening clay comprising mixing the clay with water, soda ash and sodium silicate to deflocculate the clay and depress the clay particles and subjecting the thus treated clay while in deflocculated condition to flotation in the presence of an added flotation agent selective to the impurities in the clay which are mechanically separable therefrom while passing air upwardly through the clay and forming a froth whereby such impurities are floated off in the froth and the clay from which the impurities have been removed is delivered in the tailings.

4. A method of whitening clay comprising forming a slip containing about four parts of water to one part of clay by weight, treating the slip by mixing therewith about eight pounds of soda ash per ton of clay and about four pounds of sodium silicate per ton of clay and subjecting the thus treated clay while in deflocculated condition to flotation in the presence of an added flotation agent selective to the impurities in the clay which are mechanically separable therefrom while passing air upwardly through the slip and forming a froth whereby such impurities are floated off in the froth and the clay from which the impurities have been removed is delivered in the tailings.

5. A method of whitening clay comprising forming a slip of the clay, adding a deflocculating agent to the clay to deflocculate it and subjecting the slip while in deflocculated condition to flotation in the presence of an emulsion of a fatty acid and a fatty acid amine acting as a flotation agent selective to the impurities in the clay which are mechanically separable therefrom while passing air upwardly through the slip and forming a froth whereby such impurities are floated off in the froth and the clay from which the impurities have been removed is delivered in the tailings.

6. A method of whitening clay comprising forming a slip of the clay, adding a deflocculating agent to the clay to deflocculate it, treating the slip while in deflocculated condition with a froth producing agent so that a froth is formed during the flotation and subjecting the treated slip to flotation in the presence of an added flotation agent selective to the impurities in the clay which are mechanically separable therefrom while passing air upwardly through the slip whereby such impurities are floated off in the froth and the clay from which the impurities have been removed is delivered in the tailings.

7. A method of whitening clay comprising forming a slip of the clay, treating the slip with a deflocculating agent and emulsified talloil and subjecting the treated slip while in deflocculated condition to flotation in the presence of an added flotation agent selective to the impurities in the clay which are mechanically separable therefrom while passing air upwardly through the slip and forming a froth whereby such impurities are floated off in the froth and the clay from which the impurities have been removed is delivered in the tailings.

8. A method of whitening clay comprising forming a slip of the clay, adding a deflocculating agent to the clay to deflocculate it, treating the slip while in deflocculated condition with a froth producing agent so that a froth is formed during the flotation and subjecting the treated slip to flotation in the presence of an emulsion of a fatty acid and a fatty acid amine acting as a flotation agent selective to the impurities in the clay which are mechanically separable therefrom while passing air upwardly through the slip whereby such impurities are floated off in the froth and the clay from which the impurities have been removed is delivered in the tailings.

9. A method of whitening clay comprising forming a slip of the clay, adding a deflocculating agent to the clay to deflocculate it, treating the slip while in deflocculated condition with amyl alcohol to produce a froth and subjecting the treated slip to flotation in the presence of an added flotation agent selective to the impurities in the clay which are mechanically separable therefrom while passing air upwardly through the slip whereby such impurities are floated off in the froth and the clay from which the impurities have been removed is delivered in the tailings.

10. A method of whitening clay comprising adding a deflocculating agent to the clay to deflocculate it, adding a depressant to depress the clay particles, treating the clay while in deflocculated condition with a froth producing agent so that a froth is formed during the flotation and subjecting the clay to flotation in the presence of an added flotation agent selective to the impurities in the clay which are mechanically separable therefrom while passing air upwardly through the clay whereby such impurities are floated off in the froth and the clay from which the impurities have been removed is delivered in the tailings.

11. A method of whitening clay comprising treating the clay with sodium silicate and subjecting the treated clay while in deflocculated condition to flotation in the presence of an added flotation agent selective to the impurities in the clay which are mechanically separable therefrom while passing air upwardly through the clay and forming a froth whereby the impurities are floated off in the froth and the clay from which the impurities have been removed is delivered in the tailings.

12. A method of whitening clay comprising adding a deflocculating agent to the clay to deflocculate it, subjecting the clay while in deflocculated condition to flotation in the presence of an added flotation agent selective to the impurities in the clay which are mechanically separable therefrom while passing air upwardly through the clay and forming a froth whereby such impurities are floated off in the froth and the clay from which the impurities have been removed is delivered in the tailings and bleaching the clay to eliminate colored matter which is not mechanically separable therefrom.

13. A method of whitening clay comprising removing particles of coloring matter by sedimentation, adding a deflocculating agent to the clay to deflocculate it, subjecting the clay while in deflocculated condition to flotation in the presence of an added flotation agent selective to the impurities in the clay which are mechanically separable therefrom but smaller than the particles removed by sedimentation while passing air upwardly through the clay and forming a froth whereby such impurities are floated off in the froth and the clay from which the impurities have been removed is delivered in the tailings and bleaching the clay to eliminate colored matter which is not mechanically separable therefrom.

THOMAS GOSTAGE LEEK.

REFERENCES CITED

The following references are of record in the file of this patent:

UNITED STATES PATENTS

| Number | Name | Date |
|---|---|---|
| 955,012 | Sulman | Apr. 12, 1910 |
| 1,573,385 | Feldenheimer | Feb. 16, 1926 |
| 2,185,224 | Ralston | Jan. 2, 1940 |
| 2,249,570 | Lane et al. | July 15, 1941 |
| 2,367,122 | Hoag | Jan. 9, 1945 |

OTHER REFERENCES

Bureau of Mines, Report of Investigation No. 3427, page 31.

Searle, "The Chemistry and Physics of Clays," 2nd ed., pp. 316, 331. Ernest Benn Ltd., London (1933).

Shaw, an article in Bulletin of the American Ceramic Society, vol. 16, pp. 291–294 (1937).

Berichte der Deutschen Keramischen Gesellschaft, vol. 19, 1938, pages 513 to 528, and particularly page 520.

Perry, "Chemical Engineer's Handbook," Second edition, pp. 1736–1737. Published by McGraw-Hill Co., New York, 1941.

Barr, an article in Rock Products, December 1946, pp. 88–93, 124, and 125.